INVENTORS
ALVIN BORSUK AND
NORMAN J. WEDEKIND
by Cromwell, Greist and Warden
ATTORNEYS

INVENTORS
ALVIN BORSUK AND
NORMAN J. WEDEKIND by Cromwell, Greist and Warden
ATTORNEYS United States Patent Office 3,228,442
Patented Jan. 11, 1966

3,228,442
MATERIAL COMMINUTION APPARATUS
Alvin Borsuk and Norman J. Wedekind, Madison, Wis., assignors to Oscar Mayer & Co. Inc., Chicago, Ill., a corporation of Illinois
Filed Oct. 22, 1962, Ser. No. 232,154
8 Claims. (Cl. 146—192)

This invention relates to new and improved material comminution apparatus of a type known as a continuous chopper particularly adapted for use in the comminution of meat in the manufacture of sausage-type products. More specifically, the invention deals with knife design and assembly improvements, which improvements are also especially adapted for uniquely advantageous use in a specific type of continuous chopper.

High speed operation of comminution apparatus for meat particle size reduction in the manufacture of sausage and wiener type products has been found highly desirable particularly with regard to the minimizing of mechanical working of the meat during comminution and controlling the temperature rise thereof. A specific form of continuous chopper which is uniquely appropriate for sausage and wiener meat comminution operates on a basis involving continuous introduction of meat particles into a cylindrical chopper housing with the particles being immediately subjected to the action of centrifugal force created by an assembly of knives rotating at a high speed and extending with their cutting edges into close proximity to the inner surface of the housing. The meat particles fed into the housing are centrifugally accumulated along the inner surface of the housing where they are subjected to fine, high speed chopping by the knives, the progressively comminuted particles being moved along the inner surface of the housing in the form of a continuous sleeve-like accumulation. The comminuted meat is continuously discharged from the housing into a collection and discharge zone which preferably involves the utilization of a bowl-like rotor which rotates at the same high speed and which, through the action of centrifugal force, collects along the inner surface thereof an accumulation of material which is continuously removed from the chopper by a discharge nozzle-like material pick-up means mounted in fixed relation in the collection and discharge zone. During continuous comminution in the manner described, the chopper may be subjected to vacuumization or inert gas injection as desired to protect the meat from the destructive action of oxygen and the like available from air mixed therewith. In the type of operation described, the meat is continuously moved through the chopper unit and completely comminuted to the extent desired in a short period of time thus protecting the meat from the destructive action of excessive mechanical working and/or high temperatures.

High speed comminution requires rather exacting control of the cooperating mechanical elements as well as careful maintenance thereof to maintain the efficiency of the chopper. When a chopper of this type is used with edible materials such as meat, apparatus shut down time for cleaning is frequent and it is important to maintain such time at a minimum. The particular type of comminution action is in the form of suspended particle slicing as distinguished from particle support or retention by a cutter bar or the like, this latter type of action often resulting in particle mashing and tearing as distinguished from clean slicing thereof. With the suspended slicing type operation it is especially important to maintain the fine cutting edges of the knives at peak efficiency thus requiring frequent shut down of the apparatus for re-sharpening or replacement of the knives.

It is an object of the present invention to provide new and improved material comminution apparatus of the continuous chopper type capable of improved operation involving as a part thereof a reduction in maintenance shut down time.

A further object is to provide a new and improved knife assembly for use in material comminution apparatus, especially the continuous chopper type of apparatus, the knife assembly including unique elements and features of assembly providing for improved continuous use and ready maintenance thereof.

Still a further object is to provide a new and improved chopper including as a part thereof a special circular knife assembly wherein means are provided for adjustable operative mounting of the knives to permit ready variable positioning thereof as well as total assembly and disassembly thereof for the primary purpose of maintaining peak cutting edge portions available for operative use under minimum maintenance conditions.

Other objects not specifically set forth will become apparent from the following detailed description of the invention made in conjunction with the accompanying drawings wherein.

Figure 1:
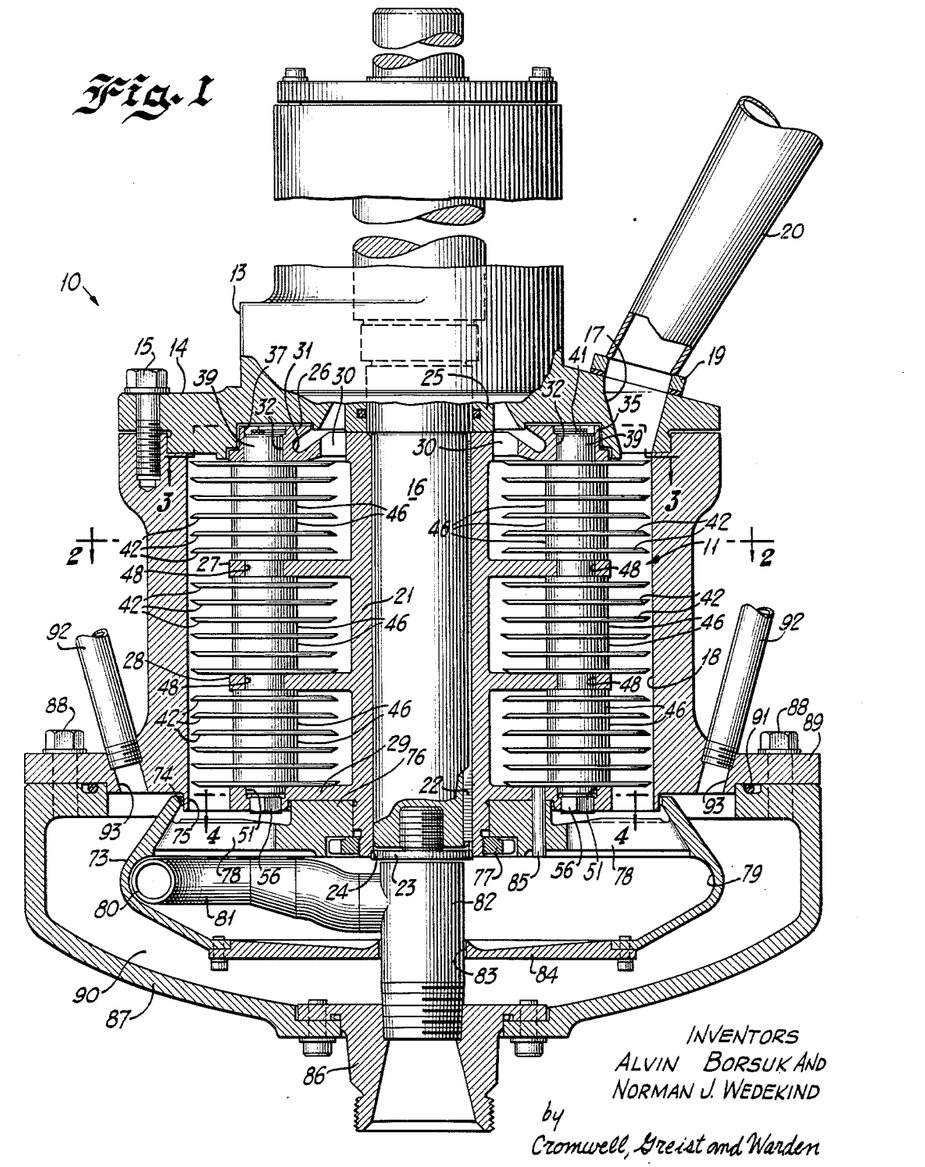
FIG. 1 is a fragmentary vertical section of a continuous chopper improved in accordance with the teachings of the present invention.

FIG. 1 illustrates a continuous chopper 10 of a type which the unique knife assembly 11 of the present invention is particularly adapted for use. The chopper 10 includes a generally cylindrical, sleeve-like housing 12 closed at the upper end thereof by removable cover plate means in the form of a housing head 13. The head 13 includes a peripheral cover flange portion 14 carrying a plurality of suitable fasteners 15 for removable attachment of the head to the housing 12. A longitudinal rotatable shaft 16 extends through the head 13 and centrally through the housing 12. This shaft is suitably journaled in the head 13 by bearing means (not shown) and is adapted for engagement with any suitable drive means (not shown) providing for high speed rotation thereof.

The peripheral flange portion 14 of the housing head 13 is formed with a material delivery opening 17 which is in communication with the inner cylindrical surface 18 of the housing 12. Suitable attachment means 19 connect a material delivery tube 20 to the flange 14 in communication with the opening 17. Meat particles or chunks, or any other suitable material to be comminuted, are introduced continuously into the housing 12 along the inner surface 18 thereof either under gravity feed or forced feed by an external pump or the like, as aided by vacuumization of the chopper 10 in a manner to be described.

The portion of the shaft 16 located within the housing 12 has received thereabout an arbor-like structure which comprises a cylindrical sleeve portion 21 suitably keyed to the shaft by a longitudinal key element 22 received in cooperating keyways extending longitudinally of the shaft and the inner surface of the sleeve portion. The bottom end of the shaft 16 receives a fastening element provided with an enlarged peripheral abutment portion 23 which is engaged with an inner peripheral shoulder 24 of the sleeve portion 21 to support the same vertically in the position of the chopper as illustrated in FIG. 1. The sleeve portion 21 at the top thereof abuts an enlarged shoulder portion of the shaft 16 and is in engagement with suitable collar means 25 forming a part of the housing head 13.

Figure 3:
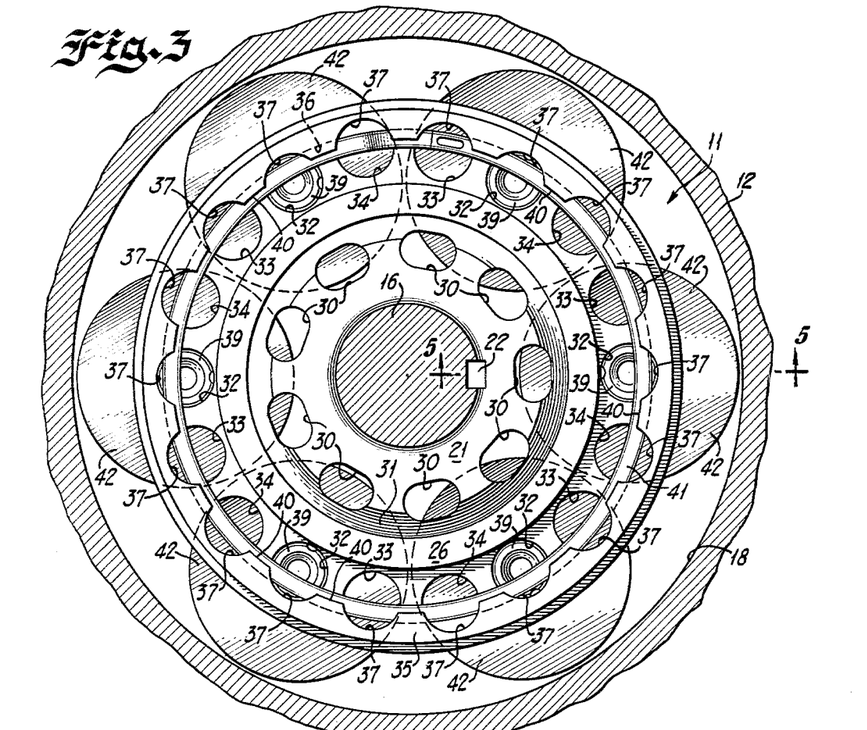
FIG. 3 is an enlarged fragmentary transverse section of another portion of the chopper taken generally along line 3—3 in FIG. 1.

The sleeve portion 21 has integrally formed therewith a plurality of longitudinally spaced and radially projecting annular supports including a top support 26, intermediate supports 27 and 28 and a bottom support 29. The top support 26 as best shown in FIGS. 1 and 3 is of web-like design including a plurality of air flow passages 30 arranged circumferentially adjacent the top end of the sleeve portion 21. A circumferentially continuous outwardly and downwardly inclined groove 31 acts as a collector for small amounts of seal lubricating oil which may pass through the seal forming a part of the collar 25 to prevent the oil from reaching the meat product. The top support 26 is formed with a circumferentially repeated series of three apertures 32, 33 and 34 defined by centers which are progressively spaced outwardly from the co-axial centers of the shaft 16 and sleeve portion 21 respectively.

Figure 5:
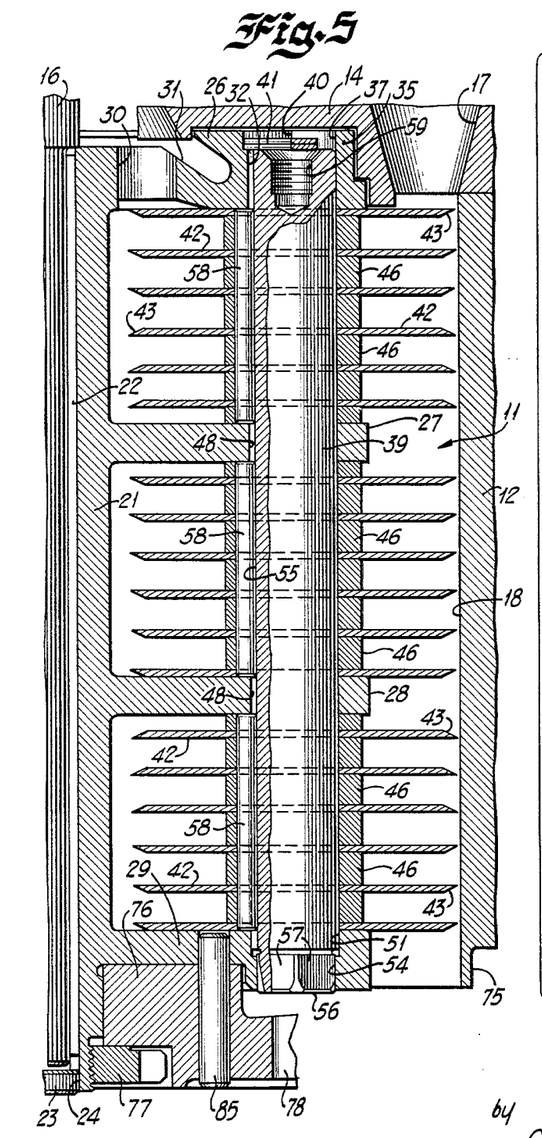
FIG. 5 is a fragmentary vertical section of a portion of the knife assembly of this chopper as viewed generally along line 5—5 in FIG. 3.

As best shown in FIGS. 3 and 5, the outer top portions of each aperture 32–34 are formed with a raised boss 35 which is circumferentially undercut at 36 and formed with a series of arcuate recesses 37. The plurality of circumferentially spaced semi-circular grooves or recesses 37 are arranged in repeating series with the apertures 32–34 and with centers of radii conforming respectively with the centers of the apertures 32, 33 and 34. Each aperture 32–34 is designed to receive therein the top end of a shaft 39 which extends downwardly in radially spaced relation from the sleeve portion 21.

The top boss portion 35 intermediate the series of apertures 32–34 is formed with a plurality of inwardly projecting clamping portions 40 including the undercuts 36 which at least partially overlie an annular retaining ring 41, which is of split ring design, extending circumferentially across the top surfaces of the plurality of shafts 39 forming a part of the knife assembly 11. With this arrangement, the retaining ring 41 removably fixes the shafts 39 in the knife assembly with the portions 40 holding the retaining ring in engagement with the top surfaces of the shafts.

Figure 6:
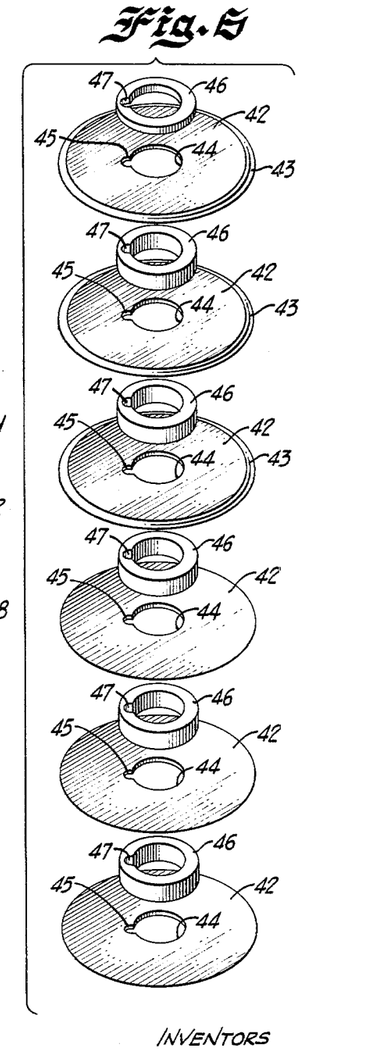
FIG. 6 is an exploded perspective of cooperating knives and spacers used in a single knife stack.

The knife assembly 11 includes a plurality of circumferentially spaced series of longitudinally aligned stacks of circular knives made up of individual knives 42. Each one of the series of knives is of identical structure and assembly and for description purposes a single series illustrated in FIGS. 5 and 6 will be described. Each series is composed of a plurality of longitudinally aligned and vertically spaced stacks of knives with the bottom stack of the series of FIG. 5 being illustrated in exploded perspective in FIG. 6. Each knife 42 is in the form of a disk provided with an outer peripherally continuous beveled cutting edge 43. Each knife is provided with a central aperture 44 including a semi-circular enlargement or groove 45. A plurality of ring-like spacers 46 are received between the knives 42 of each stack, the inner periphery of the spacers being formed with a corresponding semi-circular enlargement or groove 47 for longitudinal alignment with the grooves 45 of the knives 42. The spacers 46 may vary in thickness as illustrated by the top spacer as viewed in FIG. 6 when compared with the remaining spacers 46 thus accommodating substantially close and uniform spacing of the longitudinally aligned knives 42 of the three stacks of a single series.

Figures 2, 7, 8:
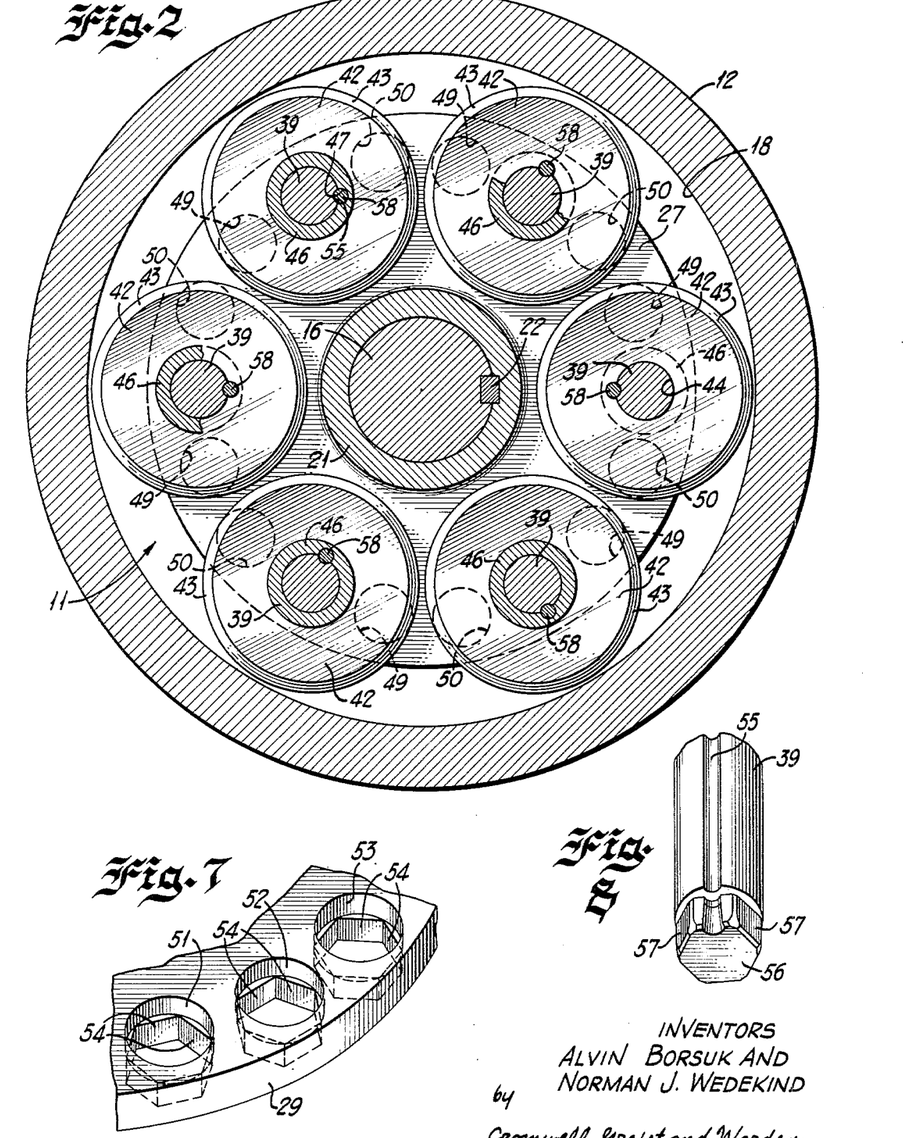
FIG. 2 is an enlarged transverse section of a portion of the chopper taken generally along line 2—2 in FIG. 1.
FIG. 7 is a fragmentary perspective of knife stack indexing means forming a part of the knife assembly.
FIG. 8 is a fragmentary perspective of an end portion of a knife support shaft forming a part of the knife assembly.

FIG. 2 illustrates one of the intermediate arbor supports 27. This support is formed with a repeated series of three apertures 48 (FIG. 1), 49 and 50 adjacent the outer periphery thereof. The repeated series of apertures 48–50 are also formed in the other intermediate arbor support 28 and the apertures are correspondingly longitudinally aligned with the apertures 32–34 of the top support 26. This means that the centers of the apertures 48–50 are progressively spaced outwardly from the center of the shaft 16.

Figure 4:
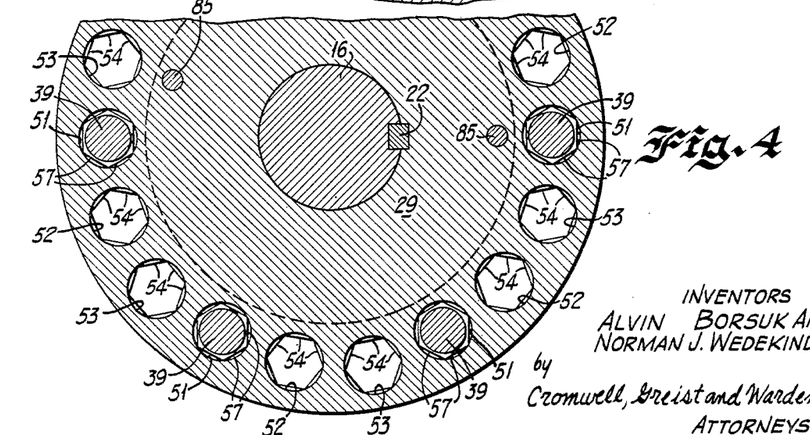
FIG. 4 is an enlarged transverse section of still another portion of the chopper taken generally along line 4—4 in FIG. 1.

The bottom arbor support 29, as best shown in FIGS. 4 and 7, is formed with a circumferentially repeated series of apertures 51, 52 and 53, the centers of which are progressively spaced outwardly from the center of the shaft 16. The repeated series of apertures in the bottom support 29 are also longitudinally aligned with the various apertures of the top and intermediate supports to selectively receive the shafts 39 therethrough. Each aperture 51–53 of the bottom support 29 is formed at the bottom portion thereof with hexagonally arranged flatted surfaces 54.

FIG. 8 illustrates a shaft 39 as being formed longitudinally thereof with an outer surface semi-circular groove 55 which extends the full length thereof. The bottom end of each shaft 39 is formed with a radially inwardly offset hexagonal locking end 56 which along the outer surface thereof defines a plurality of flats 57 conforming to the flats 54 of the apertures in the bottom support 29.

Referring particularly to FIG. 5, each shaft 39 is received through selected apertures of the various supports 26–29 and mounts a stack of knives 42 and spacers 46 thereabout between the supports 26–29. The knives and spacers of the individual stacks are locked to the shaft 39 against rotation relative thereto by a series of short locking pins 58 which are received in the aligned grooves 45, 47 and 55 of the knives, spacers and shaft respectively. The locking pins 58 are of a length to closely fit between the supports 26–29 either in end abutment or in close end association with opposed radial surfaces of the supports surrounding the apertures thereof through which the shaft 39 is inserted. The hexagonal bottom end portion 56 of the shaft 39 is received in the hexagonal portion of a selected aperture in the bottom support 29 and is selectively positioned therein to place an arcuate cutting edge segment of each of the stacked knives in close association with the inner surface 18 of the housing 12 to obtain the desired type of chopping action described above.

As best shown in FIG. 5, the top end of each shaft 39 is formed with a longitudinal tapped recess 59 adapted to receive therein a suitable shaft installation and removal tool (not shown). Such a tool may merely be in the form of a rod having a threaded end to be received in the opening 59, the rod being adapted to be pulled for shaft removal and, to be pushed, or even hammered if necessary, for shaft insertion.

The keying of the knives 42 and spacers 46 to a shaft 39 by the lock pins 58 permits controlled rotation of the series of stacks of knives on the shaft to place selected arcuate segments of the cutting edges 43 of the knives in operative association with the inner surface 18 of the housing 12. Assuming operation of the chopper 10 for a determined period of time resulting in the approaching of loss of requisite efficiency in the cutting action of the cutting edge segments in operative association with the inner surface of the housing, the chopper may be disassembled to the extent permitting access to the shafts 39 and a suitable shaft tool of the type described above may be engaged successively with each shaft 39 to lift each shaft sufficiently to clear the hexagonal bottom end 56 from the cooperating flatted surfaces 54 of the appropriate aperture in the bottom support 29. During such limited lifting of a shaft 39, the complete operative assembly of the longitudinally aligned stacks of blades 42 remains intact with the lock pin 58 merely slidable in the semi-circular groove 55 of the shaft. The series of aligned apertures of the various arbor supports maintain continued proper alignment of the stacks of blades on the shaft. The shaft 39 may then be rotated accompanied by equal rotation of the knives 42 to any one of six positions as controlled by the total number of cooperating flatted shaft locking surfaces. In this respect the hexagonal arrangement of the flatted locking surfaces is merely illustrative of a suitable number of positions for providing controlled variable positioning of selected segments of the cutting edges of the knives.

Following rotation of each shaft 39 to a selected new position, thus placing substantially unused arcuate segments of the cutting edges of the knives in operative association with the inner surface 18 of the housing 12, the shaft lifting tool is then moved downwardly with accompanying movement of the shaft into new flat sided locking engagement with the bottom portion of the aperture of the bottom arbor support 29. The chopper is then reassembled and placed back into operation. This particular arrangement provides for long life operational use of the chopper bearing in mind that resharpening of the knives thereof is unnecessary over an extended period of time. The fact that circular knives may be used also permits a material cost saving as a more extended cutting edge on each knife is available for complete use. This distinguishes from specially arcuately shaped knives provided with limited cutting edges. Additionally, the use of circular knives eliminates any need for right or left hand knives.

Figures 9, 10:
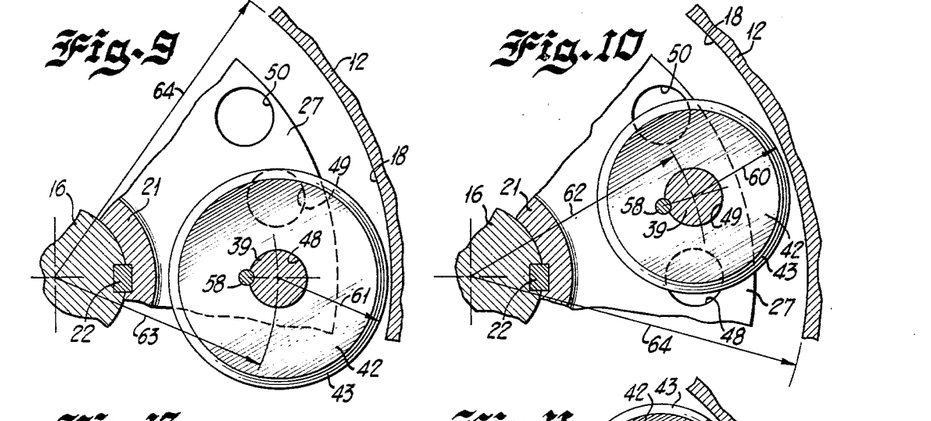
FIG. 9 is a partially schematic, fragmentary plan view of one of the knife stacks of the assembly illustrating one operative position thereof.
FIG. 10 is a view similar to FIG. 9 illustrating a second operative position of a knife stack.
Figures 11, 12:
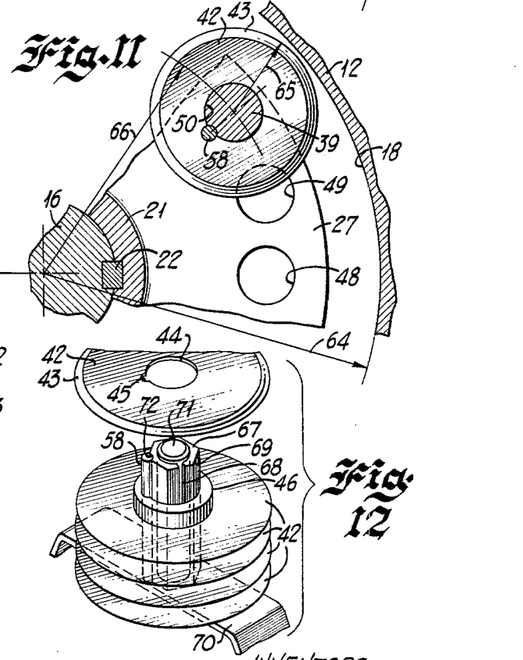
FIG. 11 is a view similar to FIGS. 9 and 10 illustrating still a further operative position of a knife stack.
FIG. 12 is an exploded perspective of special knife stack assembly means adapted for use with the chopper of the invention.

The provision of repeating series of shaft receiving apertures in the arbor supports, which apertures of each series are progressively spaced radially outwardly from the sleeve portion 21 of the arbor, permits still a further saving in cost, especially in conjunction wtih the utilization of circular knives. FIGS. 9–11 diagrammatically illustrate effective utilization of the various progressively spaced longitudinal series of apertures in the arbor support. For purposes of description the arbor support 27 is shown in FIGS. 9–11 but it will be borne in mind that the remaining arbor supports cooperatively function with the support 27 for variable radial positioning of each series of knives.

The knife series of FIG. 9 is shown operatively located by the innermost aperture 48 with the shaft 39 extending therethrough. This would be the position of new knives 42 of prescribed effective diameter with their cutting edges 43 just barely clearing the inner surface 18 of the housing 12. In the innermost position of the knife series of FIG. 9 it will be understood that the knife series will be selectively rotated in the manner described above until all of the arcuate segments of the cutting edges thereof have been utilized to their fullest extent. The knife series is then removed from the chopper and the individual knives are resharpened resulting in a reduction in diameter of the cutting edges. Resharpening as carried out to an extent that the new cutting edges when mounted on a shaft 39 through the second longitudinal series of apertures, including the aperture 49, will again be placed in efficient close cutting association with the inner surface 18 of the housing 12. This position is illustrated in FIG. 10. The radius 60 of the resharpened knife 42 of FIG. 10 is less than the original radius 61 of the knife 42 when the same was new as shown in FIG. 9. The distance 62 of the center of the aperture 49 from the center of the shaft 16 is greater than the distance 63 of the center of the aperture 48 from the center of the shaft 16 thus placing the resharpened knife 42 in proper chopping association with the inner surface 18 of the housing 12. In this respect it will be understood that the radius 64 of the inner surface 18 of the housing 12 as measured from the center of the shaft 16 remains constant under all conditions.

FIG. 11 illustrates still a third position of the knife series with the shaft 39 extending through the last aperture 50 of each series of apertures in the arbor support 27. The knife 42 has undergone still further sharpening subsequent to variable operative positioning of the knife when the same was in the position involving the aperture 49. In the position of FIG. 11 the radius 65 of the knife 42 is still further reduced by the additional resharpening but the distance 66 of the center of the aperture from the center of the shaft 16 is correspondingly increased to place the cutting edge of the knife 42 in proper operative association with the inner surface 18 of the housing 12. From the foregoing it can be appreciated that each knife 42 may be used repeatedly and effectively over an extended period of time with resharpening necessary only twice when the particular structural arrangement is utilized. However, it should be understood that any number of progressively spaced apertures may be used in the arbor supports to establish the repeating of knife series location. The total number used will depend upon the size of the chopper and the degree of comminution required to the extent that it is affected by the total number of longitudinal series of knives. Of course the arbor means itself is readily replaceable in the assembly and modified arbor means may be utilized to the extent that individual knives may be moved even closer following additional resharpening.

Figure 13:
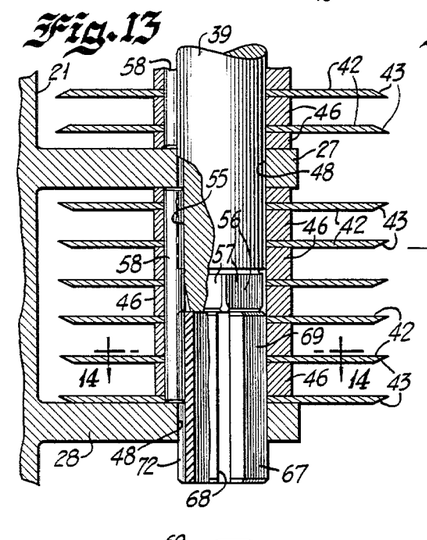
FIG. 13 is a fragmentary vertical section of a knife stack illustrating assembly thereof in the chopper.
Figure 14:
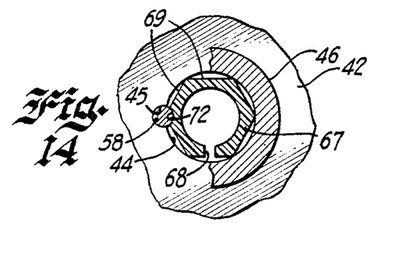
FIG. 14 is a fragmentary transverse section of the knife stack and assembly means taken generally along line 14—14 in FIG. 13.

Assembly of the multiple stacks of knives 42 in any one series thereof may be readily accomplished by use of a special plug 67 shown in FIGS. 12–14. The plug is preferably formed from at least somewhat resilient material and nylon is particularly adapted for use as it does not tend to bind when moved across metallic surfaces in relatively tight engagement therewith. The assembly plug 67 is provided with a longitudinal split portion 68 permitting radial contraction during use thereof. The outer surface is of hexagonal configuration providing the same with a plurality of flats 69 conforming to the flat surfaces 54 of the apertures 51–53 of the bottom arbor support 29. The outer dimensions of the plug 67 are such that the same will readily slide past the flat sided portions 54 of the apertures 51–53 and, as best illustrated in FIG. 7, the circular portions of these apertures are of greater overall diameter thus readily receiving the plug 67 therethrough. Similarly, the apertures of the remaining arbor supports are of a diameter to readily receive the plug therethrough.

An assembly tool of a type illustrated in FIG. 12 may be used to assemble each separate stack of knives. Such a tool includes a channel-like base plate 70 having mounted thereon an upwardly projecting pin 71 receiving thereabout the split sleeve plug 67. A locking pin 58 is suitably received in a semi-circular groove 72 (see FIGS. 13 and 14) and spacers 46 and knives 42 are alternately placed on the plug and locked thereto by the pin 58. The completed stack is then removed from the supporting pin 71 and is placed between appropriate arbor supports 26–29. The first stack of knives and spacers prepared in this manner would of course be inserted between the arbor supports 26 and 27 in alignment with selected apertures therein. The shaft 39 would be introduced past the top arbor support 26 and into end engagement with the top of the plug 67. Forcing of the shaft downwardly ultimately forces the plug through the aligned aperture in the intermediate arbor support 27 thus replacing the plug by the shaft simultaneously with the maintaining of the stack of knives in proper assembled relation. With the locking pin 58 being arranged for end abutment with an adjacent surface of an arbor support, each pin is thus retained in its stack of knives during plug removal and shaft insertion.

The foregoing procedure is repeated to operatively mount each longitudinal series of stacks of knives. During the mounting of the bottom stack between the arbor supports 28 and 29, the outer surface hexagonal configuration of the plug permits downward movement thereof through an appropriate aperture, such as aperture 51 as shown in FIG. 13. The plug 67 will ultimately fall freely from the bottom arbor support 29 and the hexagonal end portion 56 of the shaft 39 will be received in the aperture 51.

Referring again to FIG. 1, the additional basic elements of the chopper 10 include a rotatable bowl-like material accumulation and discharge rotor 73 which includes a top open end portion 74 received about a depending circumferential flange 75 formed integral at the bottom end of the housing 12. The rotor 73 is supported for rotation by a web-like structure including a central annular collar 76 received about the depending bottom end portion of the sleeve portion 21 of the support arbor and locked thereto by a suitable lock nut 77 threadedly received on the bottom depending portion. A plurality of radially projecting webs 78 extend from the central collar 76 into integral formation with the upper inner surface of the rotor 73, the webs 78 being provided with inclined top surface portions against which the comminuted material is received upon discharge thereof from the housing 12 and which provide means for distributing the material into the rotor 73. As a result of the action of centrifugal force, the comminuted material discharged from the housing 12 is accumulated along an inner surface portion 79 of the rotor 73 and is picked up therefrom into the open end 80 of a radially extending nozzle-like member 81 which is fixedly mounted on a discharge pipe 82 extending vertically downwardly through a central aperture 83 in a removable bottom plate 84 of the rotor 73.

The arrangement described provides for fixed connection of the rotor 73 with the rotating sleeve portion 21 of the arbor as well as the rotating shaft 16. Vertical drive pins 85 provide an adequate driving engagement between the central collar portion 76 of the rotor and the bottom radial support 29 of the arbor. The rotor 73 operates at the same speed as the knife assembly 11 and the continuous accumulation of material undergoing comminution flows downwardly along the inner surface 18 of the housing 12 into the rotor 73 wherein it accumulates along the circumferential inner surface portion 79 and is picked up by the discharge nozzle 81 and discharged downwardly through the fixed pipe 82.

The bottom outer surface of the fixed pipe 82 is threadedly received in a discharge fitting 86 which forms a part of a dish-shaped bottom cover plate 87 removably attached by fasteners 88 to a bottom radial flange 89 formed integral with the outer surface of the housing 12. The bottom cover plate 87 defines internally thereof a vacuum chamber 90 sealed by an O-ring 91 about the bottom of the housing 12 and the rotor 73. Suitable vacuum tubes 92 are connected with circumferentially arranged passages 93 communicating with the vacuum chamber 90. A vacuum is drawn in the vacuum chamber 90 and extends into the rotor 73 and upwardly into the housing 12 about the knife assembly 11 therein. Vacuumization is effective throughout the entire chopper to remove occluded air delivered thereinto with the material particles through the delivery tube 20. The vacuum may also be relied upon to aid in drawing the material into and through the chopper. Any suitable number of vacuum connections may be used in different desired locations. If desired, the tubes 92 may be used for the introduction of an inert gas into the chopper for replacement of occluded air in the finely chopped material to further aid in preserving the same following discharge of the material from the chopper.

To aid in efficient comminution of the material introduced into the chopper, the knives 42 of any selected series of stacks may be arranged with the bevels of the cutting edges 43 thereof facing downwardly or upwardly in predetermined relation as best shown in FIG. 5. With the relation of FIG. 5 is will be noted that the top three knives 42 of the top stack of the series are positioned with their bevels facing downwardly, whereas the bottom three knives of the top stack have their bevels facing upwardly. All of the knives of the intermediate stack have their bevels facing downwardly and only the top three knives of the bottom stack have their bevels facing upwardly. This variation in bevel facing provides for controlled retention of material undergoing comminution in the housing 12. Preferably, at least the first few knives of the top stack will be positioned so that their bevels will function to aid in moving the material undergoing comminution downwardly through the housing. Selected intermediate knives will be arranged with their bevels facing upwardly to provide for slight retention of the material in the housing to assure complete comminution thereof. The lowermost knives will preferably have their bevels facing downwardly to aid in fast discharge of the comminuted material from the housing. It will be understood that the alternate bevel facing arrangement described is not effective to provide for undue accumulation or retention of material in the housing and does not result in material flow stoppage. However, the upwardly facing bevels will function to retain to a certain extent larger particles which have not been properly comminuted and a more uniform product is obtained.

Obviously certain modifications and variations of the invention as hereinbefore set forth may be made without departing from the spirit and scope thereof, and therefore only such limitations should be imposed as are indicated in the appended claims.

We claim:

1. A rotatable knife assembly for use in a chopper, said assembly comprising arbor means having a sleeve portion for fixed mounting on a rotatable shaft, a plurality of longitudinally spaced and radially projecting supports carried by said sleeve portion, and a plurality of circumferentially spaced series of multiple longitudinally aligned stacks of circular knives mounted on said arbor means with said stacks longitudinally confined between said supports, each series of said stacks including single shaft means extending through said supports and said knives and keyed to said knives, at least one of said supports including an aperture having flatted surfaces and removably receiving a correspondingly circumferentially flatted portion of said shafts means therein, whereby selected rotative positioning of said shaft means provides for selective positioning of the cutting edge portions of said knives.

2. A rotatable knife assembly for use in a chopper, said assembly comprising arbor means having a sleeve portion for fixed mounting on a rotatable shaft, a plurality of longitudinally spaced and radially projecting supports carried by said sleeve portion, and a plurality of circumferentially spaced series of multiple longitudinally aligned stacks of circular knives mounted on said arbor means with said stacks longitudinally confined between said supports, each series of said stacks including single shaft means extending through said supports and said knives and keyed to said knives, said supports including a series of transversely spaced and longitudinally aligned apertures located progressively radially outwardly from said sleeve portion for selective positioning of said shaft means and the knives thereon relative to said sleeve portion, at least one of said supports including an aperture having flatted surfaces and removably receiving a correspondingly circumferentially flatted portion of said shaft means therein, whereby selected rotative positioning of said shaft means provides for selective positioning of the cutting edge portions of said knives.

3. A continuous chopper comprising a cylindrical housing receiving therein a rotatable knife assembly, removable cover plate means attached to one end of said housing, a rotatable shaft extending through said cover plate means and mounting said knife assembly thereon, said knife assembly comprising arbor means having a sleeve portion fixed on said shaft, a plurality of longitudinally spaced and radially projecting supports carried by said sleeve portion, and a plurality of circumferentially spaced series of multiple longitudinally aligned stacks of circular knives mounted on said arbor means in close association with the inner surface of said housing with said stacks longitudinally confined between said supports, each series of said stacks including single shaft means extending through said supports and said knives and keyed to said knives, at least one of said supports including an aperture having flatted surfaces and removably receiving a correspondingly circumferentially flatted portion of said shaft means therein, whereby selected rotative positioning of said shaft means provides for selected positioning of the cutting edge portions of said knives, bowl-like discharge rotor means enclosing the other end of said housing and fixed to said arbor means for rotation therewith, and material nozzle-like pick-up means fixed within said rotor means in association with an inner surface portion thereof to remove a material therefrom.

4. A continuous chopper comprising a cylindrical housing receiving therein a rotatable knife assembly, removable cover plate means attached to one end of said housing, a rotatable shaft extending through said cover plate means and mounting said knife assembly thereon, said knife assembly comprising arbor means having a sleeve portion fixed on said shaft, a plurality of longitudinally spaced and radially projecting supports carried by said sleeve portion, and a plurality of circumferentially spaced series of multiple longitudinally aligned stacks of circular knives mounted on said arbor means in close association with the inner surface of said housing with said stacks llongitudinally confined between said supports, each series of said stacks including single shaft means extending through said supports and said knives and keyed to said knives, said supports including a series of transversely spaced and longitudinally aligned apertures located progressively radially outwardly from said sleeve portion for selective positioning of said shaft means and the knives thereon relative to the inner surface of said housing, at least one of said supports including an aperture having flatted surfaces and removably receiving a correspondingly circumferentially flatted portion of said shaft means therein, whereby selected rotative positioning of said shaft means provides for selective positioning of the cutting edge portions of said knives, bowl-like discharge rotor means enclosinng the other end of said housing and fixed to said arbor means for rotation therewith, and material nozzle-like pick-up means fixed within said rotor means in association with an inner surface portion thereof to remove material therefrom.

5. In a high speed chopper of the type having a rotating knife assembly mounted in a housing for primary chopping action along the inner surface of said housing, the improvement comprising said knife assembly being formed from rotatable arbor means mounting thereon a plurality of separate stacks of knives with each stack extending longitudinally of said housing and fixed to said arbor means for rotation therewith, each of said knives including effective cutting edges of which only a segment is positioned at any one time for primary chopping action in close proximity with the inner surface of said housing, and knife indexing means forming a part of said knife assembly, said indexing means comprising longitudinal shaft means mounting each of said knife stacks on said arbor means, and adjustable locking means interengaging each of said shaft means and arbor means for selective fixed variable positioning of said shaft means and stacks of knives to alternately place selected cutting edge segments of the knives of a stack into close proximity with the inner surface of said housing for primary chopping action, each of said knife stacks being longitudinally sub-divided by spaced support means forming a part of said arbor means and through which single shaft means for said stack extends.

6. In a high speed chopper of the type having a rotating knife assembly mounted in a housing for primary chopping action along the inner surface of said housing, the improvement comprising said knife assembly being formed from rotatable arbor means mounting thereon a plurality of separate stacks of knives with each stack extending longitudinally of said housing and fixed to said arbor means for rotation therewith, each of said knives including effective cutting edges of which only a segment is positioned at any one time for primary chopping action in close proximity with the inner surface of said housing, and knife indexing means forming a part of said knife assembly, said indexing means comprising longitudinal shaft means mounting each of said knife stacks on said arbor means, and adjustable locking means interengaging each of said shaft means and arbor means for selective fixed variable positioning of said shaft means and stacks of knives to alternately place selected cutting edge segments of the knives of a stack into close proximity with the inner surface of said housing for primary chopping action, each of said knife stacks being longitudinally sub-divided by spaced support means forming a part of said arbor means and through which single shaft means for said stack extends, said adjustable locking means including locking pins between said shaft means and said knives to detachably fix said knives on said shaft means, said shaft means including multiple flats along a part thereof removably received in cooperating flatted means forming a part of at least one of said support means for said fixed variable positioning of said knives upon selected rotative positioning of said shaft means.

7. In a high speed chopper of the type having a rotating knife assembly mounted in a housing for primary chopping action along the inner surface of said housing, the improvement comprising said knife assembly being formed from rotatable arbor means mounting thereon a plurality of separate stacks of knives with each stack extending longitudinally of said housing and fixed to said arbor means for rotation therewith, each of said knives including effective cutting edges of which only a segment is positioned at any one time for primary chopping action in close proximity with the inner surface of said housing, and knife indexing means forming a part of said knife assembly, said indexing means comprising longitudinal shaft means mounting each of said knife stacks on said arbor means, and adjustable locking means interengaging each of said shaft means and arbor means for selective fixed variable positioning of said shaft means and stacks of knives to alternately place selected cutting edge segments of the knives of a stack into close proximity with the inner surface of said housing for primary chopping action, said adjustable locking means including locking pins between said shaft means and said knives to detachably fix said knives on said shaft means, said shaft means including multiple flats along a part thereof removably received in cooperating flatted means forming a part of said arbor means for said fixed variable positioning of said knives upon selected rotative positioning of said shaft means.

8. In a high speed chopper of the type having a rotating knife assembly mounted in a housing for primary chopping action along the inner surface of said housing, the improvement comprising said knife assembly being formed from rotatable arbor means mounting thereon a plurality of separate stacks of knives with each stack extending longitudinally of said housing and fixed to said arbor means for rotation therewith, each of said knives including effective cutting edges of which only a segment is positioned at any one time for primary chopping action in close proximity with the inner surface of said housing, and knife indexing means forming a part of said knife assembly, said indexing means comprising longitudinal shaft means mounting each of said knife stacks on said arbor means, and adjustable locking means interengaging each of said shaft means and arbor means for selective fixed variable positioning of said shaft means and stacks of knives to alternately place selected cutting edge segments of the knives of a stack into close proximity with the inner surface of said housing for primary chopping action, each of said knife stacks being sub-divided by spaced support means forming a part of said arbor means and through which single shaft means for said stack extends, said support means being provided with a series of transversely spaced and longitudinally aligned shaft means receiving apertures, said series being located progressively closer to the inner surface of said housing to permit continued mounting of resharpened cutting edges of said knives in close association with said inner surface.

References Cited by the Examiner

UNITED STATES PATENTS

| | | | |
|---|---|---|---|
| 1,583,150 | 5/1926 | Hind | 146—121 |
| 2,468,337 | 4/1949 | Lykken et al. | 146—124 X |
| 2,974,701 | 3/1961 | Eberman | 146—192 |
| 3,095,022 | 6/1963 | Schmook | 146—192 |

FOREIGN PATENTS

| | | |
|---|---|---|
| 758,934 | 11/1933 | France. |
| 650,591 | 9/1937 | Germany. |

ROBERT C. RIORDON, *Primary Examiner.*

J. SPENCER OVERHOLSER, *Examiner.*